United States Patent Office 3,300,463
Patented Jan. 24, 1967

3,300,463
POLYMERIZATION CATALYSTS AND PROCESS
Harold E. De La Mare, El Cerrito, Calif., assignor to Shell Oil Company, New York, N.Y., a corporation of Delaware
No Drawing. Filed Dec. 13, 1962, Ser. No. 244,266
8 Claims. (Cl. 260—93.7)

This invention relates to novel catalysts, catalyst systems and processes for the production of solid polymers of certain unsaturated hydrocarbons.

Heretofore, it has been known that olefins can be converted to solid polymers under very high pressures in the presence of catalysts which are capable of yielding free radicals under polymerization conditions. It has also been found heretofore that certain metal alkyls are capable of initiating the conversion of unsaturated hydrocarbons to solid polymers through a free radical mechanism. Ethylene has also been converted to solid polymers in the presence of hydrogenation catalysts, particularly in the presence of alkali metals or alkali metal hydroxide. Generally speaking, Friedel-Crafts type catalysts have not been effective for converting ethylene to solid polymers, but instead have resulted in the formation of liquid polymers with ethylene. However, it has been recently reported that solid polymers admixed with oils can be obtained by polymerizing ethylene in the presence of aluminum chloride and titanium chloride at elevated temperatures and pressures.

Redox systems have been disclosed for the polymerization of olefinic compounds. In the past, redox systems have resulted in the formation of highly branched low density polymers except at extremely high pressures at which high density ethylene polymers have been produced. In many of these systems a heavy metal compound was employed in combination with a reducing agent. In most instances, this required a heterogeneous system. While various theories have been advanced as to the mechanism of the polymerization in redox systems, the art of polymerizing unsaturated hydrocarbons in the presence of such combinations of catalyst components has not heretofore advanced to the state at which predictions could be made as to which pairs of oxidizable and reduceable components might give good results in the conversion of unsaturated hydrocarbons to solid polymers except, of course, by further experimentation.

It has been discovered in accordance with the present invention that highly useful effects are produced by combining certain polyvalent oxyalkyl derivatives of at least one Group VI–B metal with certain reducing agents for the polymerization of certain unsaturated hydrocarbons having 1-2 ethylene linkages. In specific embodiments, it has been found that chromium, molybdenum or tungsten alkoxides (preferably having 3-6 oxy substituents on the metal atom) or their derivatives in which 1-3 of the alkoxide radicals are replaced with a corresponding number of acyloxy radicals may be combined with alkyl aluminum halides for the production of solid polymers from alpha olefins. In other specific embodiments, it has been found that the same compounds of Group VI–B metals may be combined with at least one lithium alkyl for the production of polymers from conjugated dienes.

Still in accordance with this invention, novel compounds are disclosed which comprise those having the general configuration

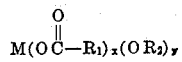

wherein M is a Group VI–B transition metal having a valence equivalent to $x+y$, $x$ and $y$ are integers, the sum of which is 3-6 (preferably 4-6) each of said integers being at least 1 and $R_1$ and $R_2$ are independently selected hydrocarbyl radicals. A method for the production of such compounds is provided wherein an arene derivative of a zero valent Group VI–B metal is reacted with an acylalkyl peroxide or mixtures thereof with dialkyl peroxides.

Still in accordance with this invention, catalyst compositions are provided comprising the above-described Group VIB metal compounds combined with 3-9 mols of a reducing agent of the group consisting of alkyl aluminum halides, lithium alkyls and lithium aluminum alkyls per mol of Group VI–B metal compounds.

The class of novel compounds and catalysts are particularly advantageous in providing, first, a homogeneous polymerization system, one which is unexpectedly long lived in its polymerization initiation activity and which, contrary to its action upon acetylenic compounds (which only form dimers when acted upon by the subject catalyst systems of this invention) form satisfactory solid resinous or elastomeric polymers and copolymers.

The novel acyloxy alkoxy derivatives of Group VI–B metals are preferably formed by the reaction of a diarene derivative of the metal in its zero valency state with alkyl acyl peroxides. Typical arene compounds which may be used for this purpose include the chromium, molybdenum or tungsten diarenes of benzene, toluene, xylene, cumene, mesitylene, and tetralin. Dibenzene chromium is a preferred species for this purpose. The peroxides comprise those in which the acyl radical contains either an alkyl substituent or an aryl substituent. The alkyl oxy radical of the peroxide preferably comprises an alkyl radical having from 3-8 carbon atoms and still more preferably a branched carbon structure such as isopropyl, tertiary butyl, secondary amyl, etc. The hydrocarbon radical attached directly to the acyl radical may be a phenyl radical, an alkylated phenyl radical or a $C_{1-8}$ alkyl radical such as methyl, ethyl, propyl, normal butyl, tertiary butyl, etc. Typical peroxides include:

sec.-butyl acetyl peroxide
t-butyl butyryl peroxide
t-butyl benzoyl peroxide
sec.-amyl acetyl peroxide
t-amyl toluyl peroxide
t-butyl dimethylbenzoyl peroxide
t-butyl isopropylbenzoyl peroxide
sec.-butyl propionyl peroxide
t-amyl valeryl peroxide
t-butyl pivaloyl peroxide
t-amyl pivaloyl peroxide The reaction is preferably conducted at temperatures between about 0° and 125° C. for a period of time between about 1 hour and 50 hours in an inert medium such as benzene and the like as well as other aromatic or aliphatic hydrocarbons which are liquid at the temperature of the reaction and are solvents for the reaction components. These novel acyl alkyl peroxides may contain varying proportions of the two types of radicals by utilizing as a third reaction component in the synthesis a variable amount of a dialkyl peroxide, preferably by a tertiary dialkyl peroxide or another acylalkyl peroxide so that the resulting product has a mixture of alkoxy radicals and acyloxy radicals. The products vary from low melting (~30° C.) volatile solids to high melting (>300° C.) non-volatile solids, apparently of a polymeric nature. Some of them have good hydrocarbon solubility (benzene, toluene, etc.), while other products are completely insoluble in hydrocarbons but soluble in organic bases, e.g., pyridine.

The above described alkoxy acyloxy metal compounds of Group VI–B may be utilized in place of or together with alkoxy derivatives of Group VI–B metals in the preparation of the catalyst compositions of this invention. The alkoxy metal compounds are prepared in a manner similar to that described above but utilizing as the peroxide a dialkyl peroxide as the component to be reacted with the diarene metal compound. Suitable dialkyl peroxides are as follows:

di(t-butyl)peroxide
di(sec-amyl)peroxide
(t-butyl)(sec-amyl)peroxide
di(t-amyl)peroxide
(t-amyl)(t-butyl)peroxide
isopropyl t-butyl peroxide
t-butyl alpha-phenyl ethyl peroxide
t-butyl cumyl peroxide
di-n-butyl peroxide
t-butyl isopropyl peroxide
t-butyl ethyl peroxide The several classes of Group VI–B metal compounds as described above when combined with the recited class of reducing agents produces the catalyst compositions of this invention. The precise valence state of the Group VI–B metal compounds subsequent to contact with the reducing agents has not fully elucidated. It is however reasonably well determined that a molar excess of the reducing agent is essential and that optimum results are obtained when 3-9 mols of the reducing agent are utilized per mol of the Group VI–B metal compounds. The most preferred ratio is between 5:1 and 7:1. The reducing agents include particularly the alkyl aluminum halides including for example diethyl aluminum bromide, di-isobutyl aluminum chloride, diethyl aluminum chloride, ethyl aluminum dichloride, the equimolar mixture of the latter two known as aluminum sesquichloride, dipropyl aluminum fluoride, diisobutyl aluminum fluoride, and the like.

Reducing agents to be combined with the Group VI–B metal compounds to form a catalyst especially suitable for the polymerization of conjugated diolefins comprise the lithium alkyls. These are exemplified by normal propyl lithium, normal butyl lithium, secondary butyl lithium, tertiary butyl lithium, secondary amyl lithium, tertiary amyl lithium and the like, the alkyl radical normally having from 3 to 8 carbon atoms each. The corresponding lithium aluminum alkyls may be employed such as lithium aluminum tetrabutyl.

The reaction, if any occurs, between the Group VI–B metal compounds and the reducing agent is apparently instantaneous since the catalyst composition can be used for its polymerizing function immediately after the several components are admixed. This is preferably done in the absence of air and moisture in an inert medium such as an aromatic hydrocarbon, e.g., benzene, toluene, xylene, and mixtures thereof.

Many of the catalyst compositions so prepared (e.g., chromium compound plus aluminum alkyl halides) are so active that they can be used for polymerizing alpha olefins, while others (e.g., wherein lithium alkyls are the reducing agents) are best suited for polymerization of conjugated diolefins to polymers. General polymerization conditions include room temperature and atmospheric pressure, although a range of temperatures from about 0 to 75° C. may be employed and pressures from atmospheric to as much as about 5000 p.s.i. may be utilized if so desired. The polymerization process according to this invention takes place most satisfactorily with the polymerization mixture including the olefin or conjugated diene is substantially moisture free and also free of any source of hydroxyl groups such as alcohol or water. Since water reacts with the catalyst, the water content of the mixture should be kept at the lowest practical minimum. As in numerous other polymerization processes, the polymerization mixture in the process of this invention is preferably kept free of oxygen since oxygen also reacts with the catalysts. In practical operation, the oxygen content should preferably be held below about 20 p.p.m.

The catalyst compositions of the invention are useful especially for the polymerization, including copolymerization, of alpha olefins and for the polymerization of conjugated dienes. Suitable alpha olefins include ethylene, propylene, 1-butene, 1-pentene, 1-hexene and the like, while preferred conjugated dienes include butadiene, isoprene and their analogs and homologs. It is preferred to eliminate diolefins from alpha olefin mixtures since alpha olefins have been found to yield greater proportions of polymer in the solid range per unit weight of catalyst when the diolefins and acetylenes are absent.

Suitable diluents used in the polymerization process are paraffins, halogenated paraffins, cycloparaffins, and/or aromatic hydrocarbons which are relatively inert, and liquid under the conditions of the process. The lower molecular weight alkanes such as propane, butane and pentane may be used as well as the higher molecular weight paraffins and cycloparaffins such as isooctane, cyclohexane and methyl cyclohexane. Halogenated aromatics such as chlorobenzene and aromatic diluents can be used such as benzene, toluene, and the like as well as mixtures thereof. The polymerization is normally conducted as stated hereinbefore at about room temperature although the temperature may range from about 0 to about 100° C. The time of polymerization will depend upon the relative activity of the specific catalyst employed and is readily determined by experts in the art.

At the completion of the polymerization reaction, when a batch process is used, the reactor is opened to vent any unpolymerized unsaturated hydrocarbon and the contents of the reactor, including any solid polymer swollen with or dissolved in the diluent, is removed from the reactor. The total recator effluent is then treated to inactivate the catalyst by injecting alcohol or other compounds bearing an active hydrogen atom. This may be carried out, for example, in a blending apparatus so that a finely divided polymer is thereby provided when sufficient alcohol or other coagulant, e.g., methanol is used for complete coagulation of the polymer. The polymer is then separated by decantation or filtration and thereafter dried. When the process of the invention is carried out continuously, the total effluent from the reactor including polymer, diluent and catalyst is pumped from the reactor as a slurry or solution to a catalyst inactivating zone where the reactor effluent is contacted with a suitable catalyst inactivating material such as alcohol and the polymer is precipitated unless it is already separated from the diluent.

The products of the polymerization conform to the usual descriptions of homopolymeric polyolefins, copolymers of polyolefins such as ethylene-higher alkene copolymers of either elastomeric or plastic variety (depending on their proportion of ethylene) and elastomeric products of the dienes such as polybutadiene and polyisoprene.

The following examples illustrate the preparation of the novel catalysts and their use in the polymerization of alpha olefins and of conjugated diolefins. Where reference is made to Group VI–B metals, it will be understood that this is based upon the Periodic Table as it appears on page 32 of the 37th Edition of the Handbook of Chemistry and Physics. The metals included therein are chromium, molybdenum and tungsten.

*Example I*

Preparation of a benzoxy butoxy chromium.

Dibenzene chromium (0.1 mole) and t-butyl perbenzoate (0.02 mole) were reacted in benzene (dry nitrogen atmosphere) whereupon the product was rapidly formed. Isolation work gave 3.1 g. of a benzene-soluble product having the following properties:

(a) Green amorphous solid; apparently polymeric, not volatile at 160° C./≦0.5 mm.

(b) Limited solubility in benzene; soluble in acetone (c) Calculated for

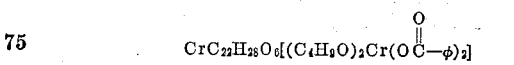

11.8 percent wt. Cr, 60.0 percent wt. C, 6.4 percent wt. H; mol. wt. 440. Found: 13.0 percent wt. Cr, 60.1 percent wt. C, 4.5 percent wt. H (equiv. to $CrC_{20}H_{19}O_{5.6}$) approximate mol. wt. (ebullioscopic in methyl ethyl ketone) 1050.

Example II

Preparation of an acetyl butoxy chromium.

Under the conditions of Example I and when utilizing t-butyl peracetate, a benzene-insoluble product was isolated (2.5 g.) which was characterized as an acetoxy butoxy chromium and had the following properties:

(a) Grayish-green amorphous solid; not volatile at 165°/≤0.5 mm.

(b) Soluble in bases, e.g., pyridine (c) *Analaysis.*—Found: 20.6% Cr, 39.8% C, 5.0% H; equiv. to $CrC_{8.3}O_{5.4}H_{13}$.

Example III

Polymerization of ethylene.

A benzene solution of chromium tetrakis (t-butoxide) (prepared from dibenzene chromium and di-t-butyl peroxide) and diethyl aluminum chloride was prepared containing a mol ratio of 6:1 aluminum:chromium, the solution containing 6 millimols/l. of the aluminum ethyl chloride. Ethylene was introduced continuously at 25° C. and formed polyethylene at a rate of 50 g./l./hr. This polymer had a melting point of 131° C. (polarizing microscope), an intrinsic viscosity of 6.5 dl./g. (decalin at 150° C.) and a density of 0.939 (g./ml., 25° C.).

Example IV

Copolymerization of ethylene and propylene.

A polymerization medium was formed comprising benzene in which were dissolved chromium tetrakis (-t-butoxide) (2 mm./l.) and diethyl aluminum chloride (6 to 30 mm./l.). A mixture of propylene and ethylene in the molar ratio of ~3:1 was introduced continuously (with >50% of the input being vented) and polymerized for 5 hours at 25° C. While polymer was formed over the entire range of catalysts studied, it was found that an optimum ratio of 5–7 mols aluminum compound per mol of chromium compound produced the highest yield of polymer (~3% solids in 5 hrs.), the latter comprising about 66 percent m. ethylene units and having an intrinsic viscosity of 2.4 dl./g. (cyclohexane/25° C.). The (elastomeric) product was ≅95% soluble in cold hexane or cold benzene.

Example V

Polymerization of butadiene.

(a) A polymerization mixture comprising benzene having dissolved therein 10 millimols/l. of secondary-butyl lithium and 1 millimol/l. of chromium tetrakis (-t-butoxide) was employed for the polymerization of butadiene (saturated solution) at 25° C. A solids content of 3.4% was achieved in 6½ hours at which point the polymerization was terminated with alcohol and the oily tacky polymer was coagulated by pouring the reaction solution into methanol. The product obtained was significant in having 72.8% 1,2 structure with 21.9% of the product being trans 1,4 and 5.3% of the product having a cis 1,4 structure. When the ratio of lithium butyl was increased above 10 mols per mol of chromium compound, the product obtained had the characteristics of that obtained with lithium butyl alone, in that the ratio of 1,2 product was reduced to about 14%, about 58% of the product being 1,4-trans and about 28% of the product being 1,4-cis.

(b) A polymerization mixture of $AlEt_2Cl$ (5.0 mm./l.) and $Cr(o-t-Bu)_4$ (1.0 mm./l.) in benzene was saturated with butadiene. Limited conversion to polymer (at 25° C.) was obtained having the structure: 66% cis, 26% trans, and 8.8% 1,2.

Example VI

Polymerization of propylene.

A benzene solution of chromium tetrakis-t-butoxide (2 mm./l.) and diethyl aluminum chloride (12 mm./l.) were saturated with dry propylene at 25° C. Propylene was continually bubbled through the solution throughout the experiment; at the end of 23 hours, a solids content of ~0.7 percent wt. was attained. The polymer was isolated by coagulation in methanol. Infrared analysis of a pressed film indicated that the product was principally atactic polypropyene with an isotactic content of roughly 30%.

Example VII

Bis(t-butoxy)-2,5-dimethylhexane-2,5-dioxy chromium.

Dibenzene chromium (0.01 mole) and 2,5-di-t-butylperoxy-2,5-dimethylhexane (0.011 mole) were reacted in refluxing benzene (nitrogen atmosphere) for ~20 hours. After removal of solvent and some unreacted peroxide, a trace of a blue material distilled over. The bulk of the product was left as a black non-volatile (at ≅120° C./0.2 mm.) residue which was extracted with anhydrous benzene. Removal of the benzene gave the principal product (~2.5 g.), a black waxy solid (15.3 percent wt. Cr, 57.7% C, 8.6% H). The product is believed to be a polymeric alkoxide of the type:

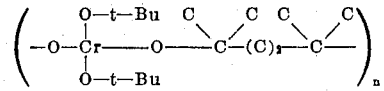

It is rapidly destroyed in the presence of air and (or) moisture.

Example VIII

Polymerizations were effected with chromium tetrakis (t-butoxide) with aluminum diethyl chloride in a mol ratio of 1:6. The polymerizations were carried out in benzene, using a 3:1 molar mixture of propylene and benzene. The product obtained had an intrinsic viscosity of 2.24 dl./g. and contained 59 mol percent ethylene.

Example I

The same conditions as in Example VIII were repeated, using as the chromium compound di(acetoyloxy)di(t-butoxy) chromium. The product was a copolymer containing 77 mol percent ethylene.

Example X

A repetition of the same conditions, utilizing as the chromium compound di(phenoyloxy)di(t-butoxy) chromium resulted in the production of an elastomeric copolymer containing 66.5 mol percent ethylene and having an intrinsic viscosity of 2.27 dl./g.

I claim as my invention:

1. A new composition of matter, Group VI–B transition metal compounds having the general configuration

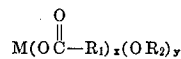

wherein M is a Group VI–B transition metal having a valence of 3–6; $x$ and $y$ are integers, the sum of which is equal to the valence of M, each of said integers being at least 1 and $R_1$ and $R_2$ are independently selected hydrocarbyl radicals.

2. A catalytic composition comprising a Group VI–B metal compound having the general configuration

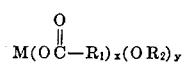

wherein M is a Group VI–B transition metal having a valence of 4–6; $x$ and $y$ are integers, the sum of which is equal to the valence of M, each of said integers being at least 1 and $R_1$ and $R_2$ are independently selected hydrocarbyl radicals and an organo metal compound of the group consisting of lithium alkyls, lithium aluminum alkyls, and alkyl aluminum halides having the general configuration $$R_{x1}AlX_{y1}$$

wherein R is an alkyl radical, X is a halogen and the sum of the integers $x_1$ and $y_1$ is equal to the valence of aluminum.

3. A catalyst composition comprising Group VI–B transition metal compounds having the general configuration $$M(O\overset{O}{\underset{\|}{C}}-R_1)_x(OR_2)_y$$

wherein M is a Group VI–B transition metal in the tetravalent state; $x$ and $y$ are integers, the sum of which is 4, each of said integers being at least 1, and $R_1$ and $R_2$ are independently selected hydrocarbyl radicals and an organo metal compound of the group consisting of lithium alkyls, aluminum alkyls and alkyl aluminum halides having the general configuration $$R_{x1}AlX_{y1}$$

wherein R is an alkyl radical, X is a halogen and the sum of the integers $x_1$ and $y_1$ is equal to the valence of aluminum.

4. A method for polymerizing an aliphatic hydrocarbon having 1–2 olefinic linkages and 2–8 carbon atoms per molecule of the group consisting of alpha olefins and conjugated dienes which comprises contacting the olefin with a catalytic composition according to claim 2 in an inert atmosphere at 0–75° C.

5. As a new composition of matter, a chromium (IV) acyloxy alkoxy compound wherein the total number of acyloxy and alkoxy radicals is 4, at least one of which is alkoxy.

6. As a new composition of matter, chromium di(acetate)di(tert-butoxide).

7. A method for the preparation of a Group VI–B metal acyloxide-alkoxide wherein the metal has a valence of 4, which comprises mixing a di(monocyclic arene) metal with an acyl alkyl peroxide whereby a metal (IV) compond is formed, said compound having the configuration of claim 1.

8. A method for the preparation of chromium diacetate di-tert-butoxide which comprises reacting together dibenzene chromium and t-butyl peracetate.

References Cited by the Examiner

UNITED STATES PATENTS 2,886,561  8/1956  Reynolds et al. ____ 260—94.9
3,113,986  12/1963  Breslow et al. _____ 260—683.9

FOREIGN PATENTS 534,792  1/1955  Belgium.
565,191  8/1958  Belgium.

JOSEPH L. SCHOFER, *Primary Examiner.*

M. B. KURTZMAN, *Assistant Examiner.*